US012681334B2

(12) United States Patent
Lagasi et al.

(10) Patent No.: US 12,681,334 B2
(45) Date of Patent: Jul. 14, 2026

(54) OPHTHALMIC ARTICLE

(71) Applicant: Barberini S.P.A., Silvi (IT)

(72) Inventors: Matteo Lagasi, Parma (IT); Natalia Schianchi, Parma (IT); Didier Clerc, Eloise (FR)

(73) Assignee: Barberini S.P.A., Silvi (IT)

( * ) Notice: Subject to any disclaimer, the term of this patent is extended or adjusted under 35 U.S.C. 154(b) by 263 days.

(21) Appl. No.: 18/561,090

(22) PCT Filed: May 17, 2022

(86) PCT No.: PCT/EP2022/063337
§ 371 (c)(1),
(2) Date: Nov. 15, 2023

(87) PCT Pub. No.: WO2022/243324
PCT Pub. Date: Nov. 24, 2022

(65) Prior Publication Data
US 2024/0231129 A1 Jul. 11, 2024

(30) Foreign Application Priority Data

May 18, 2021 (EP) ..................................... 21174499

(51) Int. Cl.
*G02C 7/10* (2006.01)
*G02C 7/12* (2006.01)
(52) U.S. Cl.
CPC ............... *G02C 7/108* (2013.01); *G02C 7/12* (2013.01)

(58) Field of Classification Search
CPC ........... G02C 7/108; G02C 7/12; G02C 7/102
USPC .................................. 351/41, 159.01, 159.56
See application file for complete search history.

(56) References Cited

U.S. PATENT DOCUMENTS

| | | | |
|---|---|---|---|
| 2002/0135735 A1 | 9/2002 | Yamamoto et al. |
| 2008/0231795 A1 | 9/2008 | Cartier |
| 2009/0122261 A1 | 5/2009 | Chou et al. |
| 2017/0261768 A1 | 9/2017 | Ambler et al. |

FOREIGN PATENT DOCUMENTS

| | | |
|---|---|---|
| CN | 102378677 A | 3/2012 |
| CN | 107533181 A | 1/2018 |
| CN | 207799260 U | 8/2018 |

OTHER PUBLICATIONS

International Search Report issued Aug. 4, 2022 in PCT/EP2022/063337 filed on May 17, 2022, 4 pages.
Combined Chinese Office Action and Search Report issued Dec. 8, 2025 in Chinese Patent Application No. 202280035975.0 (with English Translation of Office Action only), 12 pages.

*Primary Examiner* — Tuyen Tra
(74) *Attorney, Agent, or Firm* — Oblon, McClelland, Maier & Neustadt, L.L.P.

(57) ABSTRACT

An ophthalmic article including at least one colored substrate, and a polarizer fixed to that at least one colored substrate, wherein the polarizer presents, on its own, a luminous transmittance according to ISO_13666, First edition, 1998 Aug. 1 of $T_v \geq 41\%$ and a polarization efficiency PE with $90\% \geq PE \geq 78\%$.

14 Claims, 4 Drawing Sheets

Wavelength (nm)

*FIG. 2bis*

Wavelength (nm)

Wavelength (nm)

Wavelength (nm)

OPHTHALMIC ARTICLE

The present invention relates to an ophthalmic article, in particular for sunglasses.

The term "ophthalmic article" is specifically understood to mean a lens, corrective or otherwise, that can be used as spectacle glass, for spectacles for example particularly sunglasses, goggles, visors or the like.

The discussion of the background of the invention herein is included to explain the context of the invention. This is not to be taken as an admission that any of the material referred to was published, known or part of the common general knowledge at the priority date of any of the claims.

Wearing sunglasses, in particular when it is very bright outside, is medically recommended to preserve one's long-term vision potential and also for safety reasons, for example when driving.

Polarized lenses and visors are widely used for glare reducing ophthalmic articles and are especially suitable for sport activities taking place outdoors, generally in snow, water and sand environments. Polarized lenses are also highly appreciated for driving activity because they can reduce glare and provide better vision of the automobile instrumentation panel as well as the roadway.

Generally, polarized lenses are obtained by bonding a polarized film onto the plastic lens surface or introducing such film into the plastic material during the polymerization. Regardless of which particular material is used for the lens body (substrate), it is preferable in many applications to incorporate a polarizing film into the lens.

Furthermore, sunglasses form a barrier to UV (ultraviolet) rays. Many studies have shown that UV rays may engender lesions, inflammations or degradation of the cornea, of the crystalline lens or of the retina. In order to avoid these effects and above all a modification of the eye that could decrease vision long-term, people are increasingly encouraged to wear sunglasses in order to avoid exposure to too high a light intensity.

In addition, sunglasses also allow discomfort glare to be combatted, thereby increasing safety when driving or during sporting activities, for example skiing or other potentially risky activities.

However, lack of contrast may lead to the wearer of the sunglasses experiencing substantial visual fatigue and may also result in queasiness, or even cause headaches in extreme cases. This decrease in contrast may also lead to difficulties in appreciating perspective in the field of view. For a driver of a vehicle, it is possible that the traffic situation in front of the vehicle will be poorly read, this possibly representing a certain danger to the driver himself and to any other people present.

Accordingly, the present invention aims at overcoming at least one technical problem of the prior art as mentioned above.

In particular, one aim of the invention is to provide an ophthalmic article that optimizes the incident light intensity when being exposed or not to sunlight and which enhances the protection while providing a good contrast and comfort for the wearer.

The objective of the invention is therefore to provide an improved ophthalmic article allowing the drawbacks of the prior art to be at least partially solved.

With this aim, the invention proposes an ophthalmic article comprising:
at least one colored substrate and
a polarizer fixed to that at least one colored substrate, wherein the polarizer presents on its own a luminous transmittance according to ISO_13666 Tv≥41% and a polarization efficiency 90%≥PE≥78%.

The use of a polarizer with specific polarization efficiency which is lower than that of standard polarizers, and at least a certain level of luminous transmittance which is higher than that of standard polarizers, allows contrast enhancement with polarization, while providing glare protection at the same time. Such an ophthalmic article, specifically when used as sunglasses for example for a driver, allows reducing visual fatigue.

Such an ophthalmic article is very comfortable for a wearer and in particular in driving conditions when exposure can change very fast, for example when entering a tunnel on a sunny day.

The ophthalmic article may comprise one or several of the following features taken alone or in combination:

The luminous transmittance according to ISO_13666 of the polarizer on its own is for example 41%≤Tv≤48% and preferably 43%≤Tv≤46%.

According to one aspect, the polarizer may have a polarization efficiency 80%≤PE≤85%.

In particular, the ophthalmic article has for example at least one functioning state where the global luminous transmittance value of the ophthalmic article is smaller than 40%, preferably smaller than 30%, or even smaller than 20% or even smaller than 18%.

The colored substrate may exhibit contrast enhancement properties. In a further embodiment, this may imply exhibiting a relative minimum between 550-620 nm for contrast enhancement.

The colored substrate is in particular obtained by dip tinting of a contrast enhancement tint mixture.

In other embodiments the colored substrate may be obtained by bulk tinting of the substrate with a contrast enhancement tint mixture.

The ophthalmic article has in particular the capability to increase perceived separation of colors—variation of Chroma—present in the field of view of the article wearer with Kup≥13, in particular Kup≥20 and more specifically Kup≥25 in the contrast enhancement metric.

Moreover, the colored substrate can be obtained by bulk tinting of the substrate with a photochromic mixture.

The colored substrate can also be obtained for example by application of a photochromic film laminate.

According to a further aspect the ophthalmic article shows Kup≤10 in the deactivated state of the photochromic mixture and Kup≥13 in the activated state of the photochromic mixture.

The ophthalmic article may be of category "1" in the deactivated state of the photochromic mixture and of category "3" in the activated state of the photochromic mixture.

According to another possible example, the ophthalmic article is of category "2" in the deactivated state of the photochromic mixture, with a Tv≥25%, and of category "3" in the activated state of the photochromic mixture, with a Tv≤15%, and the ophthalmic article further comprises fixed dyes, so as to have a Kup≥13 in the activated state.

The invention also relates to sunglasses comprising at least one ophthalmic article as described above.

Furthermore, the invention relates to a method of forming an ophthalmic article comprising the following step:
fixing of a at least one colored substrate to a polarizer, wherein the polarizer presents on its own a luminous transmittance according to ISO_13666 Tv≥41% and a polarization efficiency 90%≥PE≥78%.

The colored substrate may be obtained by dip tinting of a contrast enhancement tint mixture or for example by bulk tinting of the substrate with a contrast enhancement tint mixture.

Other advantages and features will become apparent upon reading the description of the following figures, among which:

FIG. 2*b* is shows an example of transmission spectra of a polarizer used in accordance with the invention.

On all the figures, the same elements bear the same reference numbers.

The following embodiments are only examples. Although the description refers to one or several embodiments, the invention is not limited to theses embodiments. In addition, a feature described in relationship with one embodiment may also concern another embodiment even if this is not mentioned expressively. Simple features of different embodiments may also be combined to provide further realizations.

In the present description, by "front" or "back" face of a layer, reference is made to the propagation of the rays of light towards the eye through the ophthalmic lens when an ophthalmic device bearing the ophthalmic lens is worn on a wearer's face. Thus a "front" face is always that which is closest directed toward the user's field of view and a "rear" face is always that which is closest to the eye of the user.

By "upstream" or "downstream" of two elements or layers, one refers to the propagation of the rays of light towards the eye in the same system as presented above. Thus, a first element is disposed upstream of a second element when the light passes through its path towards the eye of the user first through the first element and then through the second element. Conversely, a first element is disposed "downstream" of a second element when the light passes through its path towards the eye of the user first through the second element and then through the first element.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%.

Class or category of an ophthalmic article refers to the current European standard, EN 1836:2005 and are defined as follows:

Category 0—80%-100% transmission—for fashion, indoor use, or cloudy days

Category 1—43%-80% transmission—low sun exposure

Category 2—18%-43% transmission—medium sun exposure

Category 3—8%-18% transmission—strong brightness, light reflected of water or snow Category 4—3%-8% transmission—intense sunshine for high mountains, glaciers; not for use when driving or on the road.

The standard further states that an overlap of +/−2% between categories 0 and 1, 1 and 2 or 2 and 3 is tolerated. This means for example that ophthalmic articles with a transmission of 19% may be considered to be sold as either a category 2 or a category 3 ophthalmic article.

Figure 1:
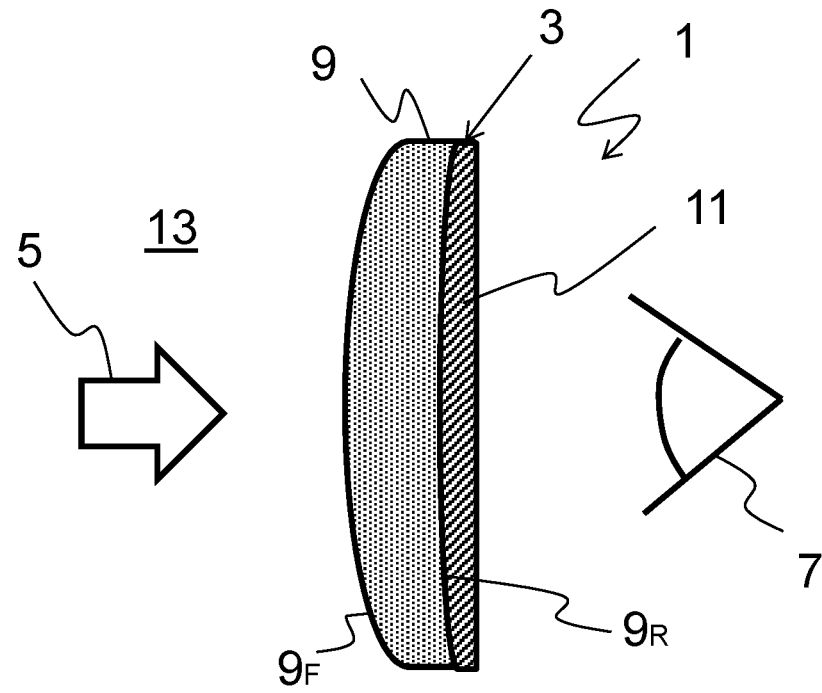
FIG. 1 is a schematic cross-sectional view of an example of an embodiment of an ophthalmic article according to the invention.
Figure 2:
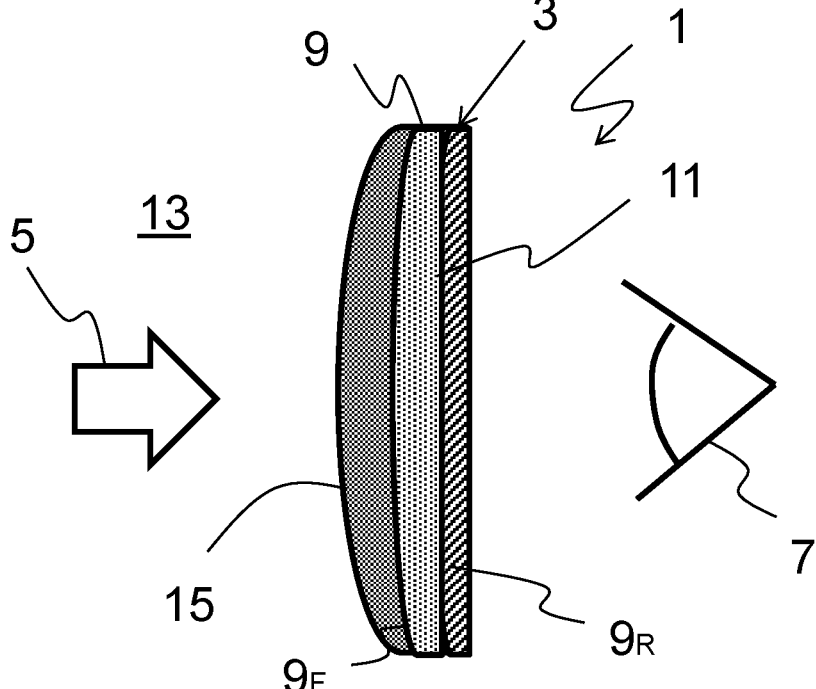
FIG. 2 is a schematic cross-sectional view of another example of an embodiment of an ophthalmic article according to the invention.

The ophthalmic article 1 as shown in the FIGS. 1 and 2 is for example intended to be used for spectacles, in particular sunglasses. To do this, it is only necessary to shape the outer edge 3 according to the desired shape of the frame of the eyeglasses or sunglasses. Alternatively, and within the scope of the disclosure, the ophthalmic article may be intended for goggles, vision visors or the like.

In FIGS. 1 and 2 are shown two examples of an ophthalmic article 1. The light incident on the ophthalmic article 1 is shown by the arrow 5 and an eye 7 represents a user. The field of view 13 is thus situated on the side of the arrow 5 and the user looks through the ophthalmic article 1 with his eye 7.

By ophthalmic article 1 is meant a corrective lens or not (plano-lens), finished or semi-finished, suitable for being mounted in a frame, for example a spectacle frame, goggles, a mask or a visor intended to be placed in front of the eyes and forming a screen of visual protection.

The ophthalmic article 1 comprises at least one colored layer or substrate 9.

The substrate 9 is for example made of a plastic material, thermoset, in particular made of poly(urea-urethane), or thermoplastic plastic material, in particular made of polyamide (PA), like nylon or a polycarbonate, or polyester.

The substrate 9 has a rear face 9R to be oriented toward the eye 7 of the user and a front face 9F to be oriented toward the field of vision 13 of the user. The substrate 9 has a for example a thickness comprised between 0.5 mm and 5 mm, preferentially comprised between 1 mm and 4 mm, most preferably between 1.4 mm and 4 mm or even between 1.5 mm and 3 mm.

However, other thicknesses for substrate 9 can be chosen in function for example of the optical correction of the ophthalmic article 1. In particular, if an optical correction is desired, substrate 9 may have a non-uniform thickness, so that its front face 9F has a different curvature than its rear face 9R.

In this embodiment the ophthalmic article is in particular a plano lens, i.e. a lens considered without optical power.

In another embodiment, the rear face 9R of the substrate 9A may be surface finished for a corrective effect.

According to a non-shown embodiment, the colored substrate 9 may be composed of several substrate layers fixed together. One of these layers, in particular the one closest to the eye may be crystal and present on the rear side a curvature for optical correction of the users view.

The colored substrate 9 comprises for example one or more colorants and/or pigments, said colorants and/or pigments of all the substrates interacting together.

At least some of the colorants, dyes and/or pigments may exhibit photochromic properties.

Photochromic colorants, dyes or pigments exhibit a reversible change in color when exposed to light radiation involving ultraviolet rays, such as the ultraviolet radiation in sunlight or the light of a mercury lamp. Various classes of photochromic compounds have been synthesized for use in applications in which a sunlight-induced reversible color change or darkening is desired. The most widely described classes of photochromic compounds are spyro-oxazines, spyro-pyrans and fulgides.

The general mechanism responsible for the reversible change in color, i.e., a change in the absorption spectrum in the visible range of light (400-700 nm) exhibited by different types of photochromic compounds has been described and categorized. See John C. Crano, "Chromogenic Materials (Photochromic)", Kirk-Othmer Encyclopedia of Chemical Technology, Fourth Edition, 1993, pp. 321-332, incorporated herein by reference. The general mechanism for the most common classes of photochromic compounds involves an electronic mechanism causing the transformation of a colorless open ring form into a colored closed ring form.

In the afore described mechanisms, the photochromic compounds require an environment in which they can reversibly transform. In solid polymer matrices, the rates at which the photochromic processes of activation, i.e., formation of color or darkening, and fading, i.e., the return to the original or "colorless" or "less colored" state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183-190, incorporated herein by reference. One of the main obstacles reported by Claus D. Eisenbach, for the larger commercial application of photochromic systems, is the slow rate of photochromic activation and fade in a solid polymer matrix.

The use of photochromic compounds in polyurethanes to produce optical articles has been described in U.S. Published Patent Application 2001/0050356, and references cited therein.

Following photochromic dyes in particular naphthopyrans, or indeno-fused naphthopyrans may be used.

The colored substrate may be therefore obtained by bulk tinting of the substrate with a photochromic mixture, meaning a mixture containing one or several photochromic dyes, colorants or pigments for example.

As an alternative with regard to FIG. 2, the colored substrate may be obtained by application of a photochromic film laminate 15.

An ophthalmic article 1 exhibiting photochromic properties as stated above shows a different luminous transmittance value Tv whether exposed or not to light containing UV light (for example sunlight) to activate the photochromic dye, pigment or colorant.

In this case, the ophthalmic article exhibits two "functioning states", an activated or "dark" state when exposed to light containing UV light and a deactivated or "faded" state when not exposed to light containing UV light.

As a difference to standard polarizers with high PE and low Tv, the present configuration allows to jump or pass two categories of the current European standard, EN 1836:2005 between the deactivated state and the activated state. For example the ophthalmic article 1 is of category 1 in deactivated state of the photochromic dye, colorant or pigment and of category 3 in activated state of the photochromic dye, colorant or pigment.

This means that in this embodiment, in the deactivated state the ophthalmic article 1 has a transmission value greater or equal to 41%, and in the activated step a transmission value less or equal to 20%, which corresponds to the values of the categories 1 and 3 as to current European standard, EN 1836:2005 respectively, tolerances included. Preferably the ophthalmic article 1 is strictly within the categories of current European standard, EN 1836:2005, and thus in the deactivated state it has a transmission value greater or equal to 43%, and in the activated step a transmission value less or equal to 18%.

Ophthalmic articles 1 with no photochromic properties only exhibit one single functioning state.

According to a further example, the colored substrate 9 exhibits contrast enhancement properties but no photochromic properties.

The inclusion of a plurality of light attenuating dyes, colorants or pigments affords enhanced color contrast by selectively filtering specific light wavelength ranges.

Although contrast enhancement is subjective based on individual preferences of lens wearers, certain contrast-enhancing features can be combined to enhance perception of primary colors. For example, reducing light transmission in the wavelength regions that overlap the primary colors enhances the primary colors.

The colored substrate 9 is for example obtained by dip tinting of a contrast enhancement tint mixture.

According to an alternative, the colored substrate 9 is obtained by bulk tinting of a substrate with a contrast enhancement tint mixture.

To do so, dyes or pigments providing specific transmission minima centered for example at around 495 nm, 585 nm and 700 nm to achieve contrast enhancement are used in the tint mixture.

Furthermore, the colored substrate 9 may be obtained in combining photochromic and contrast enhancement colorants, dyes or pigments by bulk tinting and/or dip tinting.

In this context, treatments conferring additional functions, either alone or in combination among the following non-exhaustive list: shockproof, anti-scratch, anti-abrasion, anti-fouling, anti-fogging, anti-static may be deposited on the substrate 9, in particular on front face 9F with negligible influence of the transmission spectra of the ophthalmic article 1.

The ophthalmic article 1 further comprises a polarizer 11 fixed to said at least one colored substrate 9 for example on its backside $9_F$.

The colored substrate 9 has for example an effect of at least −10%, preferentially −15%, in particular −20% or even −23% on the Tv value of the ophthalmic article 1. In other words, the Tv value of the colored substrate is equal or higher than 77%, in particular 80% or 85% and at most 90%.

In case the backside $9_F$ is curved, the polarizer 11 fits to the shape of the backside $9_F$ of the substrate 9.

The polarizer 11 may be realized as a film or a as wafer/wafer construct which may be premanufactured. The polarizing wafer/wafer construct is for example a PC/PVA/PC polarizing wafer construct (PC=polycarbonate, PVA=an H-sheet of polyvinyl alcohol (PVA) polymer impregnated with iodine).

The polarizer 11 (film or wafer construct) presents on its own (meaning taken as such) a luminous transmittance according to ISO_13666 Tv≥41%, more specifically 41%≤Tv≤48%, preferably 43%≤Tv≤46% and a polarization efficiency 90%≥PE≥78%, in particular 80%≤PE≤85%.

The polarizer 11 may in particular be of neutral grey color, meaning a flat spectral transmittance that does not or only slightly have an impact on the color perception through substrate 9.

FIG. 2b is shows an example of transmission spectra of a polarizer used in accordance with the invention. As one can see, the transmission is nearly constant between 430 nm (T=43%) and 630 nm (T=46.5%). Thus a polarizer 11 with flat spectral transmittance can be characterized by a transmission variation of less than 10%, preferably less than 5% or in particular as in the example less than 3.5% in a wavelength range between 430 nm and 630 nm.

For reminder, the luminous transmittance in ISO standard 13666, First edition, 1998 Aug. 1 is defined as:

$$\tau_v = 100 \times \dfrac{\displaystyle\int_{380\ nm}^{780\ nm} \tau(\lambda) \cdot V(\lambda) \cdot SD65\lambda(\lambda) \cdot d\lambda}{\displaystyle\int_{380\ nm}^{780\ nm} V(\lambda) \cdot SD65\lambda(\lambda) \cdot d\lambda}\ \%$$

where $\tau(\lambda)$ is the spectral transmittance of the tinted spectacle lens;

$V(\lambda)$ is the spectral luminous efficiency function for daylight (see *ISO/CIE* 10527);

$S_{D65\lambda}(\lambda)$ is the spectral distribution of radiation of *CIE* standard illuminant *D*65(see *ISO/CIE* 10526).

One commercial example for such a polarizer exhibiting the above properties is known as polarizer TG45 manufactured by the Wintec Corp—Japan having a luminous transmittance Tv=44% and a polarizing efficiency of PE=84%. Another commercial example for a polarizer is known as polarizer ZP1431 M004 manufactured by Sumitomo Bakelite having a luminous transmittance Tv=41% and a polarizing efficiency of PE=85%.

The ophthalmic article 1 is for example designed such that at least one of its functioning state (the activated or dark state in case of photochromic properties) where the global luminous transmittance value Tv of the ophthalmic article is smaller than about 30%, or even smaller than 20%. In a further embodiment, in at least one of its functioning state (the activated or dark state in case of photochromic properties) the global luminous transmittance value Tv is smaller or equal to 18%, and for example equal to 12% or 10%.

Furthermore, the ophthalmic article 1 is tailored so as to increase perceived separation of colors—variation of Chroma—present in the field of view of the article wearer. This feature may be characterized by the ophthalmic article having a score Kup≥13 in the contrast enhancement metric, in particular Kup≥20.

Indeed, a panel of trained users confirmed that on polar lenses, the Kup value of 13 was a hinge value in the sense that observation through polar lenses with Kup<13 did not have much impact on color separation while lenses having a higher Kup value than 13 started to show an enhanced separation of color effect.

Kup (KOLOR UP SCORE) is determined by looking at how much the Chroma value C*ab is increased comparing the vision with the lens and without it. The higher is the delta Chroma the greater is the color perception and the higher Kup.

The delta Chroma is measured on a chosen palette of colors called colorchecker (see for example the link https://en.wikipedia.org/wiki/ColorChecker) which is a color calibration target consisting of a cardboard-framed arrangement of 24 squares of painted samples. The ColorChecker was introduced in a 1976 paper by McCamy, Marcus, and Davidson in the Journal of Applied Photographic Engineering (C. S. McCamy, H. Marcus, and J. G. Davidson (1976).

"A Color-Rendition Chart". Journal of Applied Photographic Engineering 2(3). 95-99).

For every of these given colors of the standard color palette, one gets a delta Chroma value resulting from the comparison of observation the vision with the lens or without it.

One may then determine a relative or "normalized" delta Chroma value by dividing the delta Chroma by the initial un-filtered Chroma value.

The 24 colors of the cardboard-framed arrangement of squares of painted samples are defined without lens with a D50 illuminant:

| Sample No | Color name | L* | a* | b* |
|---|---|---|---|---|
| 1 | dark skin | 37.986 | 13.555 | 14.059 |
| 2 | light skin | 65.711 | 18.13 | 17.81 |
| 3 | blue sky | 49.927 | −4.88 | −21.925 |
| 4 | Foliage | 43.139 | −13.095 | 21.905 |
| 5 | blue flower | 55.112 | 8.844 | −25.399 |
| 6 | bluish green | 70.719 | −33.397 | −0.199 |
| 7 | Orange | 62.661 | 36.067 | 57.096 |
| 8 | purblish blue | 40.02 | 10.41 | −45.964 |
| 9 | moderate red | 51.124 | 48.239 | 16.248 |
| 10 | Purple | 30.325 | 22.976 | −21.587 |
| 11 | yellow green | 72.532 | −23.709 | 57.255 |
| 12 | orange yellow | 71.941 | 19.363 | 67.857 |
| 13 | Blue | 28.778 | 14.179 | −50.297 |
| 14 | Green | 55.261 | −38.342 | 31.37 |
| 15 | Red | 42.101 | 53.378 | 28.19 |
| 16 | Yellow | 81.733 | 4.039 | 79.819 |
| 17 | Magenta | 51.935 | 49.986 | −14.574 |
| 18 | Cyan | 51.038 | −28.631 | −28.638 |
| 19 | white (.05*) | 96.539 | −0.425 | 1.186 |
| 20 | neutral 8 (.23*) | 81.257 | −0.638 | −0.335 |
| 21 | neutral 6.5 (.44*) | 66.766 | −0.734 | −0.504 |
| 22 | neutral 5 (.70*) | 50.867 | −0.153 | −0.27 |
| 23 | neutral 3.5 (1.05*) | 35.656 | −0.421 | −1.231 |
| 24 | Black | 20.461 | −0.079 | −0.973 |

This table give thus for the standard color palette the unfiltered Chroma value, meaning without lens which may be designated by $C_{SP*ab}$ (index SP means here standard palette).

For every of these colors i (i=1 to 24) a filtered Chroma value is measured, meaning with lens which may be designated by CLF*ab (index LF means here lens filtered). These measurement values give thus for the standard color palette the filtered Chroma value CLF*ab.

For every color i (i=1 to 24), a Delta Chroma ratio may be calculated as $$\Delta C_i^* = \frac{(C_{LF\ ab}^*(i) - C_{SP\ ab}^*(i))^2}{(C_{SP\ ab}^*(i))^2}$$

The higher is the delta Chroma the greater is the color perception. Then the Kup (Kolor up score) is determined as the average of the selected 6 highest relative or normalized delta Chroma ratio among these 24 colors of the color palette, which is then multiplied by 100 for ease of reading.

$$Kup = 100 * \frac{1}{6} \sum_{k=1}^{6} \overline{MAX(i = 1 - 24)\Delta C_i^*}$$

where $$\overline{\text{MAX}(i = 1 - 24)\Delta C_i^*}^{6}$$

are the six highest normalized delta Chroma ratio among these 24 colors of the color palette.

Standard ISO/CIE 11664-4 specifies in its part 4 the method of calculating and measuring the coordinates in the CIE 1976 L*a*b* colour space including correlates of lightness, Chroma and hue. a* and b* are the colorimetric coordinates in the CIELAB 1976 color space. And Chroma C*ab is defined by $$C_{ab}^* = \left[ (a^*)^2 + (b^*)^2 \right]^{1/2}$$

For the measurements of the Chroma values, the ISO standard conditions are applied in particular a 1500 lx, illuminator D65 which is used for illumination.

The invention also relates to a method of forming an ophthalmic article 1 comprising a step of fixing of a at least one colored substrate 9 to a polarizer 11, wherein the polarizer presents on its own a luminous transmittance according to ISO_13666, First edition, 1998 Aug. 1, Tv≥41% and preferably greater than 43%≤Tv≤46%, and a polarization efficiency 90%≥PE≥78%.

The fixing step may be done through introducing the polarizer in a mold and forming the lens in such mold comprising the polarizer or by later application, by lamination, of the polarizer onto the manufactured substrate, for example through use of an adhesive.

A stated above, the colored substrate 9 may be obtained by dip tinting of a contrast enhancement tint mixture or by bulk tinting of the substrate 9 with a contrast enhancement tint mixture.

Figure 3:
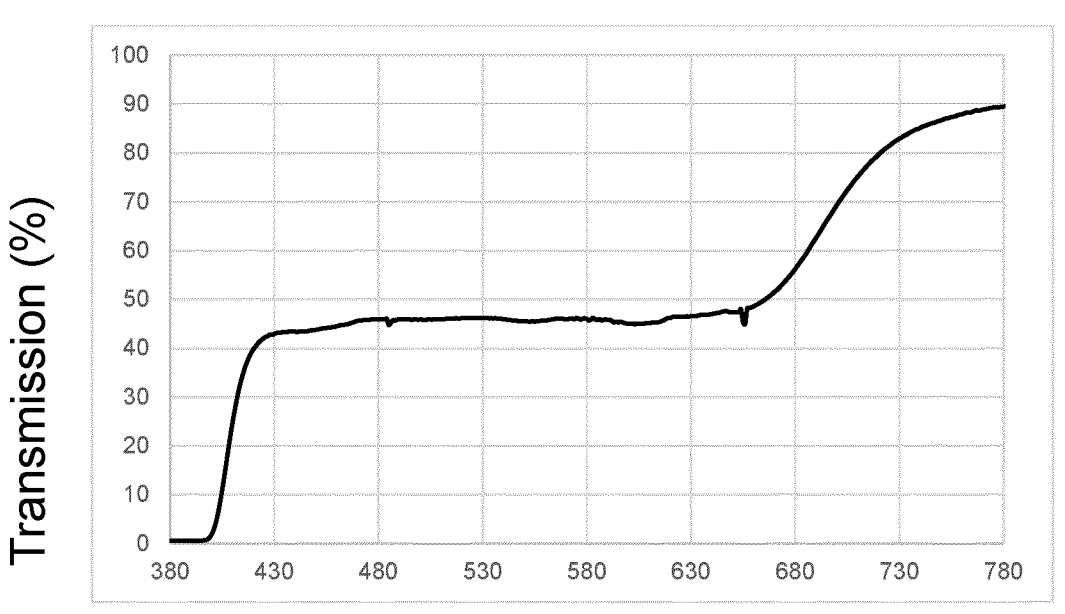
FIG. 3 shows some comparative examples of transmission spectra of the ophthalmic article according to the state of the art and according to the invention.
Figure 3:
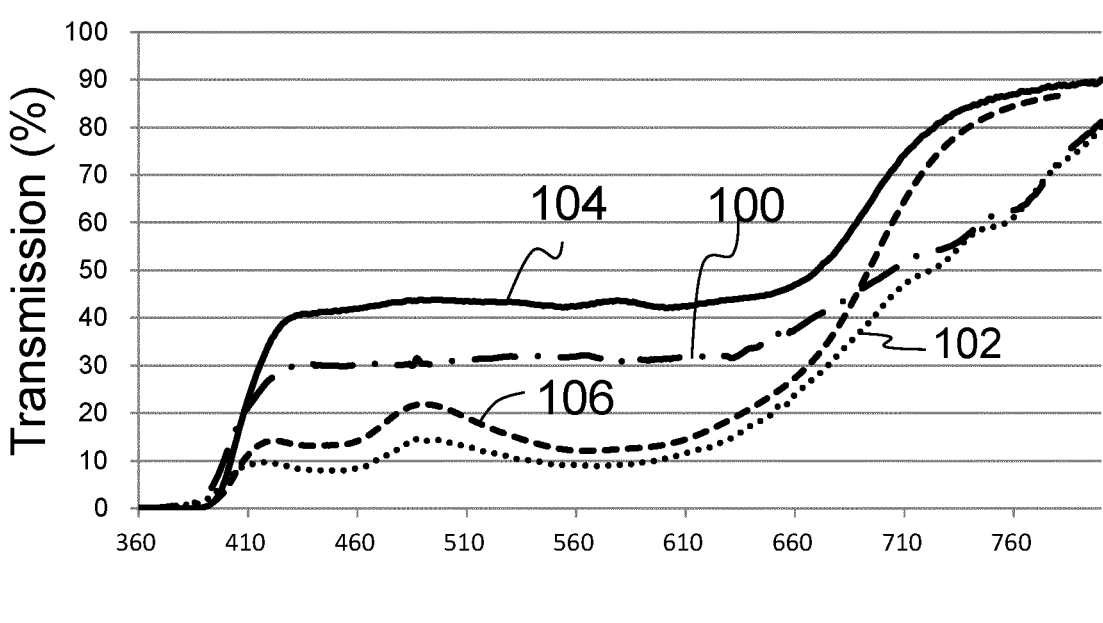

FIG. 3 shows transmission spectra of two different ophthalmic articles 1 having each a colored substrate 9 with photochromic properties as described above.

Spectrum 100 and 102 correspond to a standard polar photochromic grey lens according to the state of the art and having Tv=30% and a polarization efficiency PE=95%.

Spectrum 100 corresponds to a spectrum where the photochromic dye is faded or deactivated.

Spectrum 102 corresponds to a spectrum where the photochromic dye is dark or activated.

This ophthalmic article 1 of the state of the art belongs to Cat 2 (Tv=30%) in the faded or deactivated state and to Cat 3 (Tv=11%) in the dark or activated state. In this configuration of the state of the art, photochromism only allows a jump of one category between the activated and the deactivated state.

Spectrum 104 and 106 correspond to a polar photochromic grey lens with a polarizer 11 having features according to the invention and more specifically Tv=43% and a polarization efficiency PE=85%.

Spectrum 104 corresponds to a spectrum where the photochromic dye is faded or deactivated.

Spectrum 106 corresponds to a spectrum where the photochromic dye is dark or activated.

This ophthalmic article 1 according to the invention (spectra 104 and 106) belongs to Cat 1 (Tv=43%) in the faded or deactivated state and to Cat 3 (Tv=15%) in the dark or activated state. In this configuration of the state of the art, photochromism allows jumping or passing two categories between the activated and the deactivated state.

In a general manner, jumping or passing two categories between the activated and the deactivated state is for example achieved when the ophthalmic article shows in the deactivated state a transmission value Tv≥41, and in the activated step a transmission value TV≤20, preferably in the deactivated state having a transmission value Tv≥43, and in the activated step a transmission value Tv≤18. The last example is limited mostly to "neutral grey color". As already stated above, jumping or passing of two categories can also take into account the tolerances of Tv value of +/−2% as defined by the standard cited above. Notwithstanding the present disclosure, such performances are usually possible only with lenses which are in class 0 in the deactivated state, and especially without polarized films.

FIGS. 4-7 show further examples of spectrum concerning ophthalmic articles 1 according to the invention.

Figure 4:
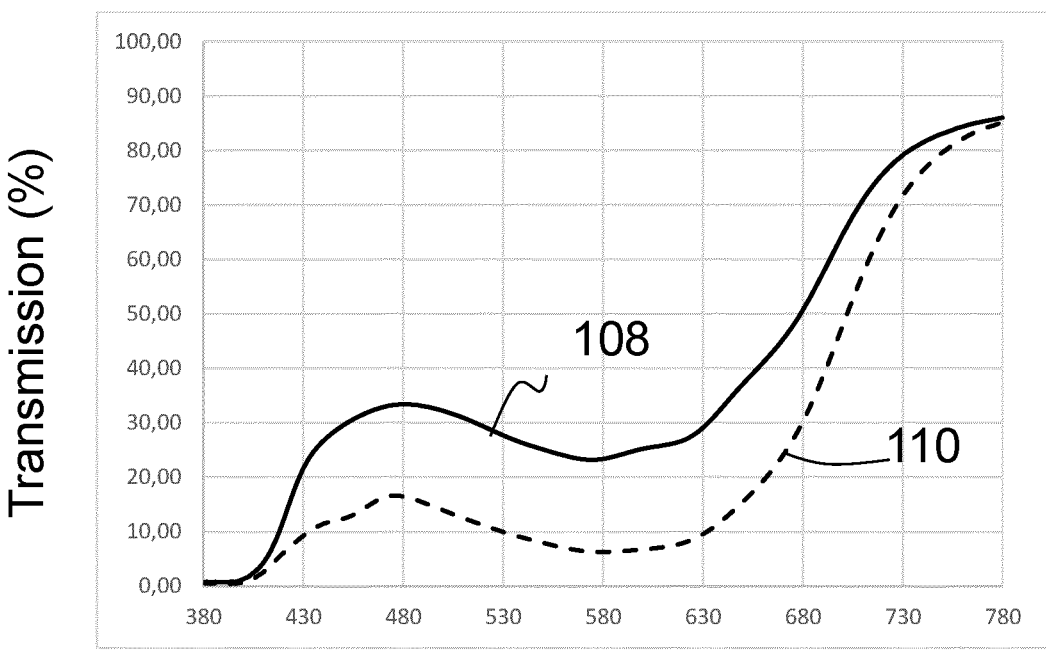
FIGS. 4-7 show other examples of transmission spectra of the ophthalmic articles according to the invention.

Spectrum 108 and 110 of FIG. 4 correspond to a polar photochromic grey lens with a polarizer 11 having features according to the invention and with a polarization efficiency PE=85%.

Spectrum 108 corresponds to a spectrum where the photochromic dye is faded or deactivated. In this case Tv=27% and Kup=7.

Spectrum 110 corresponds to a spectrum where the photochromic dye is dark or activated and where Tv=9% and Kup=16.

This ophthalmic article 1 according to the invention (spectra 108 and 110) belongs to Cat 2 (Tv=27%) in the faded or deactivated state and to Cat 3 (Tv=9%) in the dark or activated state. In this configuration of the state of the art, photochromism allows a jumping or passing of one category between the activated and the deactivated state.

Figure 5:
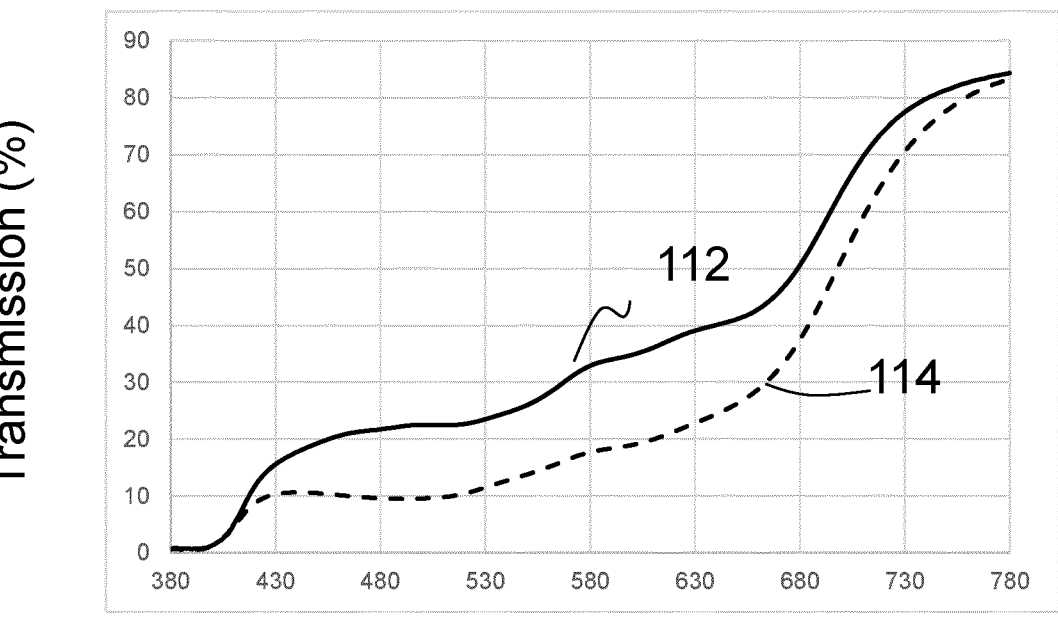

Spectrum 112 and 114 of FIG. 5 correspond to a polar photochromic brown lens with a polarizer 11 having features according to the invention and with a polarization efficiency PE=85%.

Spectrum 112 corresponds to a spectrum where the photochromic dye is faded or deactivated. In this case Tv=28% and Kup=7.

Spectrum 114 corresponds to a spectrum where the photochromic dye is dark or activated and where Tv=15% and Kup=13.

This ophthalmic article 1 according to the invention (spectra 112 and 114) belongs to Cat 2 (Tv=28%) in the faded or deactivated state and to Cat 3 (Tv=15%) in the dark or activated state. In this configuration of the state of the art, photochromism allows a jumping or passing of one category between the activated and the deactivated state.

Figure 6:
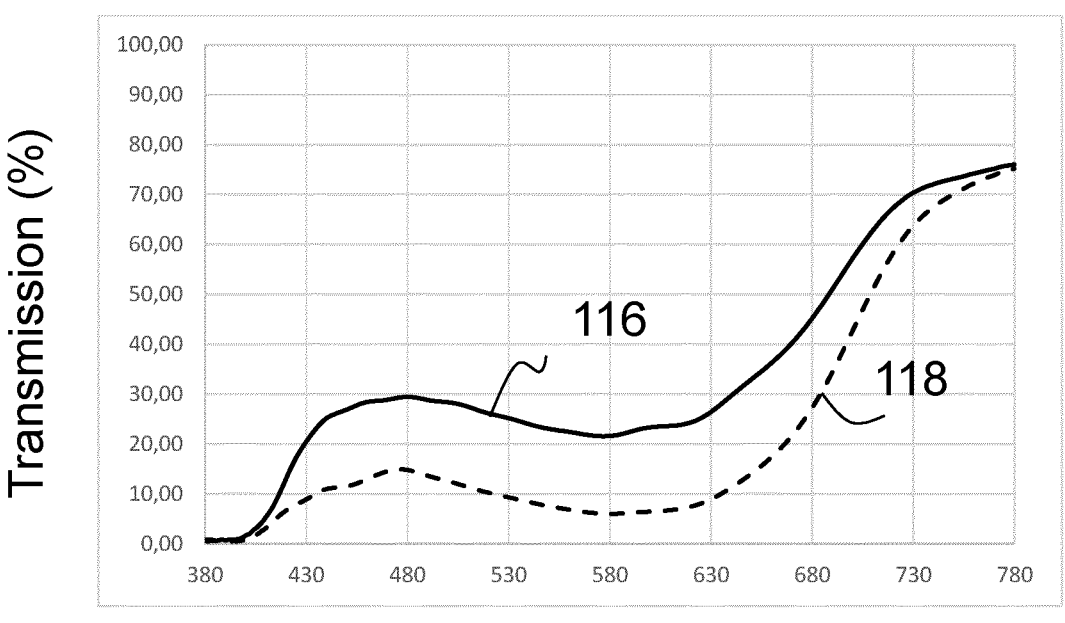

Spectrum 116 and 118 of FIG. 6 correspond to a polar photochromic grey lens with a polarizer 11 having features according to the invention and with a polarization efficiency PE=85%.

Spectrum 116 corresponds to a spectrum where the photochromic dye is faded or deactivated. In this case Tv=30% and Kup=7.

Spectrum 118 corresponds to a spectrum where the photochromic dye is dark or activated and where Tv=10% and Kup=15.

This ophthalmic article 1 according to the invention (spectra 116 and 118) belongs to Cat 2 (Tv=30%) in the faded or deactivated state and to Cat 3 (Tv=10%) in the dark or activated state. In this configuration of the state of the art, photochromism allows a jumping or passing of one category between the activated and the deactivated state.

Figure 7:
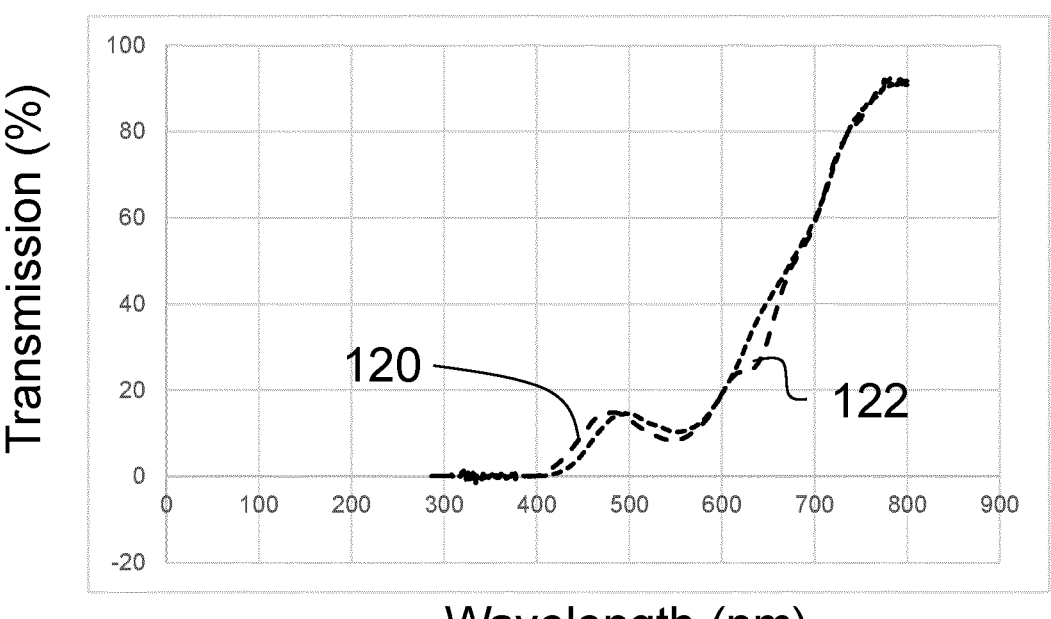

Spectrum 120 and 122 of FIG. 7 correspond to a specific lens with a polarizer 11 having features according to the invention and with a polarization efficiency PE=85%.

Spectrum 120 corresponds to a spectrum where the photochromic dye is activated with Tv=13% and Kup=28.

Spectrum 122 corresponds to a spectrum where the photochromic dye is dark or activated and where Tv=14.7% and Kup=29.

This ophthalmic article 1 according to the invention (spectra 120 and 122) belong respectively to Cat 3 in the dark or activated state with enhanced color perception.

From the above, on understands that the use and combination of a colored substrate (photochromic or not), in particular when colored with a color enhancing mixture, allows to improve contrast enhancement with polarization, while providing glare protection at the same time.

In particular when combined with a colored photochromic substrate 9, a wearer can appreciate a good vision inside because the attenuation is that of a category 1 lens while being well protected under sunlight where the lens shifts to a category 3 protection.

When driving, such ophthalmic articles 1 provide good vision even in fast changing light environments for example due to clouds or tunnels.

The invention claimed is:

1. An ophthalmic article, comprising:

at least one colored substrate; and a polarizer fixed to the at least one colored substrate, wherein the polarizer presents a luminous transmittance, according to ISO_13666, First edition, 1998 Aug. 1, $T_v \geq 41\%$ and a polarization efficiency $90\% \geq PE \geq 78\%$, the polarizer has a transmission variation of less than 10% in a wavelength range between 430 nm and 630 nm, the at least one colored substrate exhibits contrast enhancement properties, and the ophthalmic article increases perceived separation of colors—variation of Chroma—present in a field of view of an article wearer with $K_{up} \geq 13$, in a contrast enhancement metric, with $$Kup = 100 * \frac{1}{6} \sum_{k=1}^{6} \overline{MAX[[(i = 1 - 24)]]\Delta C_i^*}$$

where $$\overline{[[(MAX[[(i = 1 - 24)]]\Delta C_i^*)]]}$$

are six highest normalized delta Chroma ratios among 24 colors of a standard color palette.

2. The ophthalmic article according to claim 1, wherein the luminous transmittance, according to the ISO_13666, First edition, 1998 Aug. 1, of the polarizer is $41\% \leq T_v \leq 48\%$.

3. The ophthalmic article according to claim 1, wherein the polarizer has a polarization efficiency $80\% \leq PE \leq 85\%$.

4. The ophthalmic article according to claim 1, wherein the ophthalmic article has at least one functioning state in which a global luminous transmittance value of the ophthalmic article is smaller than 40%.

5. The ophthalmic article according to claim 1, wherein the at least one colored substrate is obtained by dip tinting of a contrast enhancement tint mixture.

6. The ophthalmic article according to claim 1, wherein the at least one colored substrate is obtained by bulk tinting of the substrate with a contrast enhancement tint mixture.

7. The ophthalmic article according to claim 1, wherein the at least one colored substrate is obtained by bulk tinting of the substrate with a photochromic mixture.

8. The ophthalmic article according to claim 7, wherein the ophthalmic article shows $K_{up} \leq 10$ in a deactivated state of the photochromic mixture and $K_{up} \geq 13$ in an activated state of the photochromic mixture.

9. The ophthalmic article according to claim 7, wherein the ophthalmic article is of category "1" in a deactivated state of the photochromic mixture and of category "3" in an activated state of the photochromic mixture.

10. The ophthalmic article according to claim 7, wherein the ophthalmic article is of category "2" in a deactivated state of the photochromic mixture, with a $T_v \geq 25\%$, and of category "3" in an activated state of the photochromic mixture, with a $T_v \leq 15\%$, and the ophthalmic article further comprises fixed dyes, so as to have a $K_{up} \geq 13$ in the activated state.

11. The ophthalmic article according to claim 1, wherein the at least one colored substrate is obtained by application of a photochromic film laminate.

12. Sunglasses comprising the ophthalmic article according to claim 1.

13. A method of forming the ophthalmic article, comprising:

fixing the at least one colored substrate to the polarizer, the polarizer and the at least one colored substrate being according to claim 1.

14. An ophthalmic article, comprising:

at least one colored substrate; and a polarizer fixed to the at least one colored substrate, wherein the polarizer presents a luminous transmittance, according to ISO_13666, First edition, 1998 Aug. 1, $T_v \geq 41\%$ and a polarization efficiency $90\% \geq PE \geq 78\%$, and wherein the ophthalmic article is of category "2" in a deactivated state of a photochromic mixture, with a $T_v \geq 25\%$, and of category "3" in an activated state of the photochromic mixture, with a $T_v \leq 15\%$, and the ophthalmic article further comprises fixed dyes, so as to have a $K_{up} \geq 13$ in the activated state.

\* \* \* \* \*